United States Patent

Takada

[11] 4,315,638
[45] Feb. 16, 1982

[54] TRANSFER DEVICE FOR PASSIVE VEHICLE OCCUPANT RESTRAINT BELTS

[76] Inventor: Juichiro Takada, 3-12-1 Shinmachi Setagayaku, Tokyo, Japan

[21] Appl. No.: 172,278

[22] Filed: Jul. 25, 1980

[30] Foreign Application Priority Data

Aug. 6, 1979 [JP] Japan ............................ 54-107668[U]

[51] Int. Cl.³ .............................................. B60R 21/10
[52] U.S. Cl. ...................................... 280/803; 280/804
[58] Field of Search ................. 280/803, 804; 297/469

[56] References Cited

U.S. PATENT DOCUMENTS

| | | | |
|---|---|---|---|
| 3,827,713 | 8/1974 | Sakuai | 280/803 |
| 3,842,929 | 10/1974 | Wada | 280/804 |
| 3,933,369 | 1/1976 | Kaneko | 280/803 |
| 4,274,658 | 6/1981 | Takata | 280/803 |

*Primary Examiner*—Robert R. Song
*Attorney, Agent, or Firm*—Brumbaugh, Graves, Donohue & Raymond

[57] ABSTRACT

A passive vehicle occupant shoulder belt of the type in which the belt leads from a retractor on the door through a guide ring affixed near the upper rear corner of the door and then leads down and in across the seat to an inboard location near the lower rear part of the seat comprises a control tape that is fastened to the belt and slidably connected to a guide bar that extends along the upper part of the door. The free end of the control tape is fastened to a control ring through which the belt freely passes. The tape is thus formed into a loop, and when the fastened end of the loop moves away from the guide bar, the control ring is pulled toward the guide bar and pulls the belt closer to the door.

1 Claim, 3 Drawing Figures

TRANSFER DEVICE FOR PASSIVE VEHICLE OCCUPANT RESTRAINT BELTS

FIELD OF THE INVENTION

The present invention relates to passive vehicle occupant restraint belts and, in particular, to a shoulder belt which transfers between the occupant-restraining and the occupant-releasing positions upon closing and opening motions of the door without the use of any motion transmitting device.

BACKGROUND OF THE INVENTION

Various proposals have been put forward for passive safety belt systems, that is, occupant restraining belt systems which automatically move to an occupant-restraining configuration when an occupant enters the vehicle and move to an occupant-releasing position when the occupant leaves the vehicle. Some of the proposed systems use wire and pulley drives or racked wire drives powered by an electric motor or a mechanical motion amplifier to move belt guide rings from one position to another. Such systems require numerous components, complicated vehicle assembly procedures and, in general, considerably increase the cost of the vehicle. Such devices may be prone to service and reliability problems, depending on the particular design, in many cases.

A much simpler and less costly passive occupant restraint system that has recently come into use comprises an energy-absorbing knee bolster located under the dashboard and capable of minimizing injury to the lower body and legs of a vehicle occupant and a passive shoulder belt which leads from an inboard position below and behind the occupant to an upper rear corner of the door. In some cases, the belt retractor is located at the inboard location and the outboard end of the shoulder belt is secured to an anchor. In other cases, the inboard end of the belt is fixed and the retractor is located between the inner and outer door panels and leads up from the retractor through a belt guide ring affixed near the upper rear corner of the door.

FIG. 1 of the accompanying drawing shows a prior art passive shoulder belt. The belt 10 leads upwardly from an emergency locking retractor 12 installed in the door 14 through a belt guide 16 that is fastened to the door near the upper rear corner and leads inwardly and downwardly across the vehicle seat 18 to an inboard fastening point constituted by an emergency release buckle 20. One end of a control tape 22 is fastened to the belt 10 at a distance from the buckle 20 such that when the door is closed and the belt is in the occupant-restraining configuration, the fastening point where the tape 22 is attached to the belt is located near the guide ring 16. The other end of the tape 22 is fastened to a slider 24 that runs forward and backward along a guide bar 26. When the door is opened, it moves forwardly and outwardly relative to the inboard end of the belt. Therefore, an additional length of belt is pulled from the retractor 12. Meanwhile, the distance between the buckle 20 and the point where the control tape 22 is fastened to the belt 10 remains the same. The slider 24 moves along the guide bar 26 to a forward position, as shown in FIG. 1. Accordingly, the control tape holds an intermediate part of the belt in the occupant-releasing configuration upwardly and forwardly from the position it would otherwise assume, were the tape not included.

Although the system shown in FIG. 1 has, by reason of the control tape arrangement, the advantage of a better occupant-releasing configuration than a system not having the control tape arrangement (i.e., a passive shoulder belt which leads directly from the inboard location to the upper rear corner of the door), the belt still gets in the way of an occupant who is entering or leaving the vehicle because the tape allows the intermediate part of the belt to remain a substantial distance rearwardly from the front pillar.

SUMMARY OF THE INVENTION

There is provided, in accordance with the present invention, an improvement in the system shown in FIG. 1 that moves the intermediate part of the belt much closer to the front pillar where it presents less obstruction to an occupant entering or leaving the vehicle. Like the prior art shoulder belt shown in FIG. 1, the invention comprises a control tape fastened at one end to the shoulder belt and slidably connected to a guide bar located near the upper edge of the door, but instead of fastening the free end of the control tape to the slider, the control tape either passes freely through a slot in the slider or wraps around the guide bar and extends back toward the belt to a control ring through which the belt freely passes. Thus, the tape is formed into a loop such that when the door is opened, the fastened end of the tape loop moves away from the guide bar and pulls the control ring toward the guide bar, thus pulling the belt closer to the door.

For a better understanding of the invention, reference may be made to the following description of an exemplary embodiment taken in conjunction with the accompanying drawing.

DESCRIPTION OF EXEMPLARY EMBODIMENT

Figure 1:
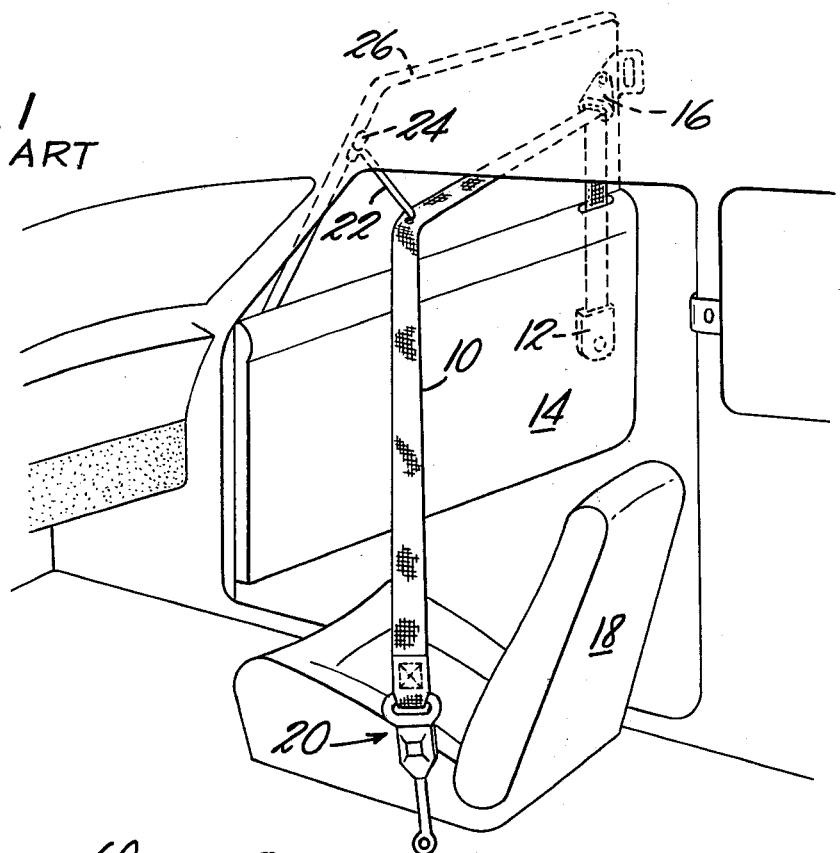
FIG. 1 is a pictorial view of a prior art passive shoulder belt.
Figure 2:
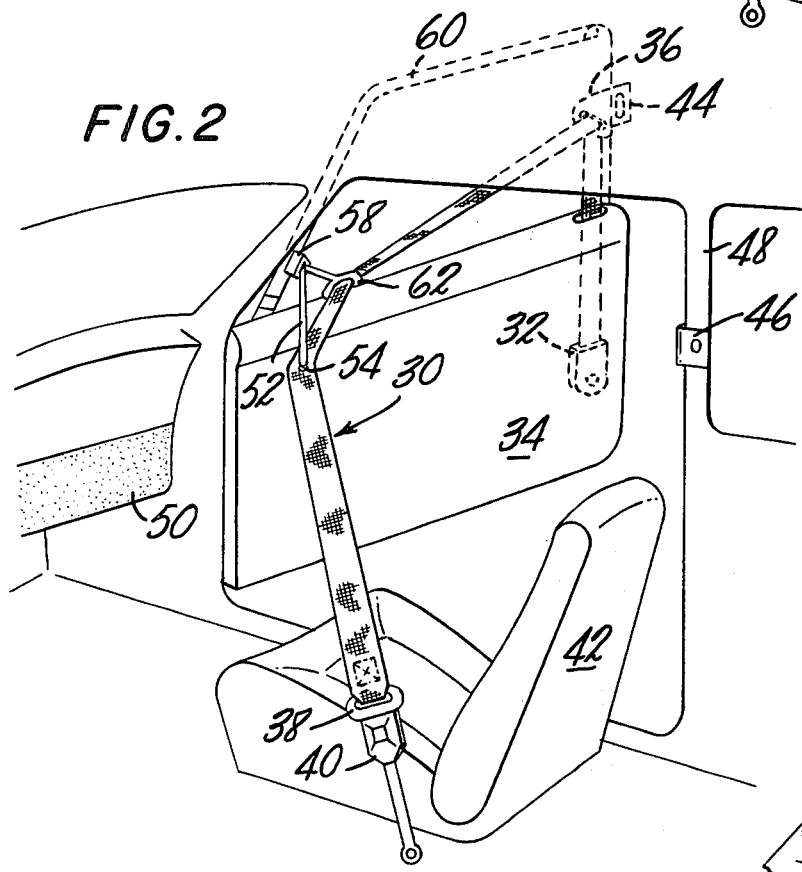
FIG. 2 is a pictorial view of an embodiment of the present invention.

The shoulder belt 30 leads from an emergency locking retractor 32 installed between the inner and outer panels of the door 34 near the rear of the door upwardly to and through a guide ring 36 that is fixed to the rear edge of the door a short distance below the upper rear corner. The inboard end of the belt 30 is fastened to a buckle tongue 38 which is normally received in an emergency release buckle 40 affixed adjacent the inboard lower rear portion of the vehicle seat 42. Preferably, the guide ring 36 includes a slotted lug 44 that mates with a retainer bracket 46 secured to the center pillar 48 of the vehicle. FIG. 2 shows an energy-absorbing knee bolster 50 located under the dashboard for protecting the lower body and legs of the occupant by absorbing the energy of forward motion of the lower body in the event of a crash, but the present invention may be used with a lap belt instead of the knee bolster.

Figure 3:
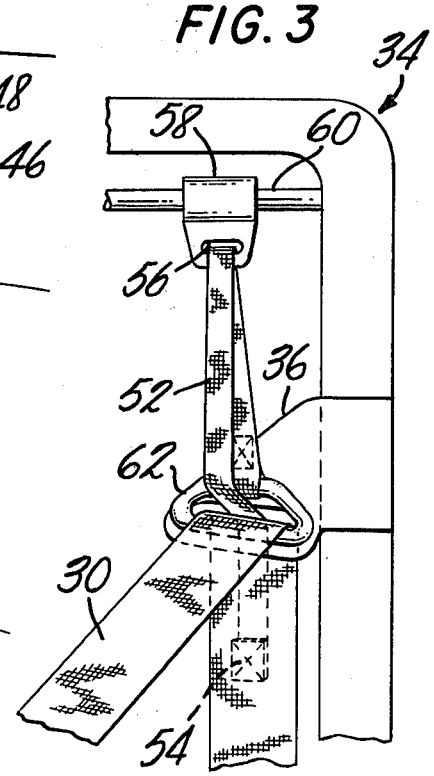
FIG. 3 is a partial pictorial view showing the part of the belt near the upper corner of the door in the occupant-restraining configuration.

One end of a control tape 52, which is preferably a high strength, non-extensible webbing, but can also be a cord, a wire or the like, is fastened to the belt 30 at a location such that when the belt is in the restraining configuration (see FIG. 3), the fastening point 54 is located somewhere in the region of the guide ring 36 but is not subjected to any load and thus does not distort the shoulder belt from the normal restraining configuration across the occupant's upper body. As shown in FIG. 3, in the case of smaller occupants, the fastening point 54 will actually be pulled through the guide ring 36 and be located some distance along the vertical run toward the retractor 32. In the case of larger occupants (not shown), the fastening point 54 will lie at some point along the diagonal section leading inwardly from the guide ring.

The tape 52 leads from the fastening point 54 to and through a slot 56 in a slider 58 carried by a guide bar 60 that is fastened to the door 34 and runs along the top of the door from rear to front and then turns down along the upper part of the front of the door (see FIG. 2). The free end of the tape 52 is fastened to a control ring 62 through which the belt 30 freely passes. When the door is closed (FIG. 3), the control ring 62 is brought down against the guide ring 36. Accordingly, when the door is closed, the control tape and ring have no affect on the proper positioning of the belt in the occupant-restraining configuration.

When the door is opened, a length of the belt 30 is pulled from the retractor 32. The fixed distance between the control tape and the buckle 40 compels the slider 58 to be moved along the guide bar 60—more precisely, the slider 58 is pulled through the guide bar 60 as the door opens, inasmuch as the slider can only be moved out a short distance and therefore moves along an arc generally forwardly, while the guide bar swings outwardly and forwardly with the door. In the final stages of the door opening motion, the fastened portion of the control tape 52 is pulled through the slider 58, and the control ring 62 is correspondingly pulled toward the slider, thereby moving the intermediate part of the belt adjacent the door opening farther forward so that the belt presents less obstruction to the entrance or departure of an occupant.

I claim:

1. A passive vehicle occupant restraint belt system having a shoulder belt that leads from an anchor adjacent the lower rear inboard portion of the seat to and through a fixed guide adjacent the upper rear corner of the door and thence to a retractor on the door, a guide bar that extends from the guide forwardly along the upper part of the door and a control tape that is fastened to the belt and slidably connected to the bar such that when the door is opened, the control tape holds an intermediate part of the belt adjacent the upper part of the door, characterized in that there is a control ring on the free end of the tape which slidably receives the intermediate part of the belt, the tape thereby being formed into a loop such that when the door is opened the fastened end of the tape loop moves away from the bar and the control ring moves toward the bar and pulls the belt closer to the door.

* * * * *